Jan. 29, 1929.  G. H. DANSEREAU  1,700,351
CHAIN
Filed March 20, 1928
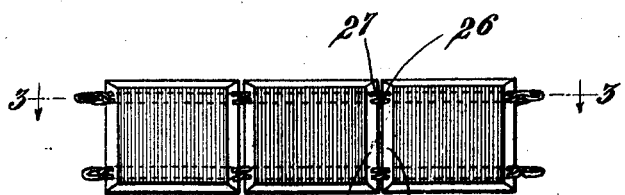
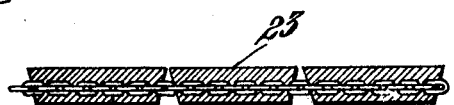
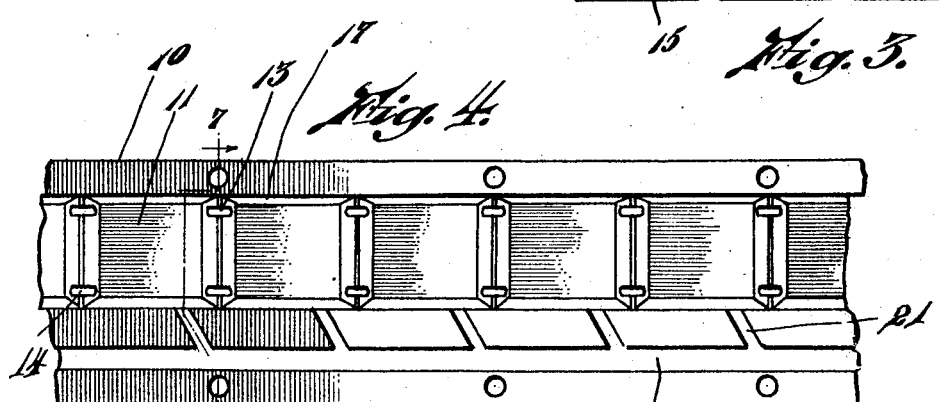
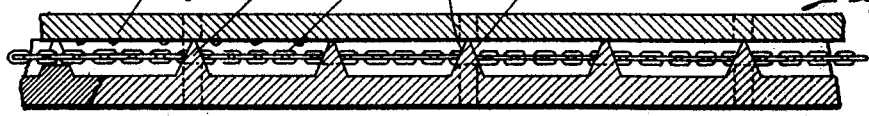
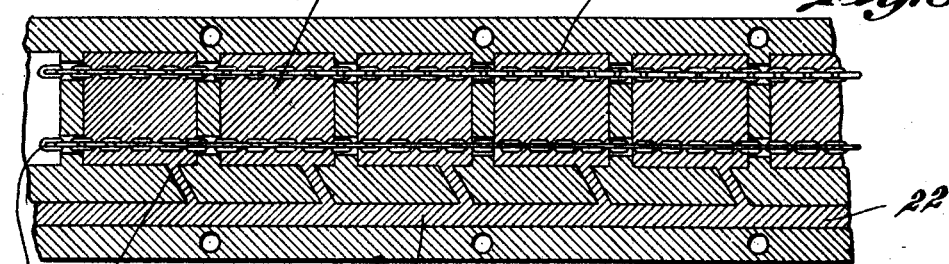
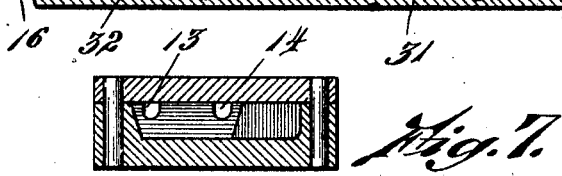
INVENTOR.
George H. Dansereau,
BY Barlow & Barlow
ATTORNEYS.

Patented Jan. 29, 1929.

1,700,351

UNITED STATES PATENT OFFICE.

GEORGE H. DANSEREAU, OF JOHNSTON, RHODE ISLAND, ASSIGNOR TO COYNE, ROBIDOUE & CO., OF PROVIDENCE, RHODE ISLAND, A COPARTNERSHIP COMPOSED OF GEORGE A. COYNE AND SAMUEL F. ROBIDOUE.

CHAIN.

Application filed March 20, 1928. Serial No. 263,185.

This invention relates to a block link chain for use as a bracelet, necklaces and similar articles; and has for its object to flexibly connect a series of block links together in a simple and efficient manner.

A further object of the invention is the imbedding of two relatively swingingly movable parts, one part in one link and the other part in the next adjacent link to flexibly connect the block links together.

A still further object of the invention is the casting of a plurality of block links about relatively swingingly movable parts to flexibly connect the block links together.

The invention further consists in the casting of a series of block links about chains formed of a series of loop links with a joint of the loop links between the block links whereby the block links are flexibly connected together.

With these and other objects in view, the invention consists of certain novel features of construction, as will be more fully described, and particularly pointed out in the appended claims.

In the accompanying drawings:

Fig. 1 is a top plan view of a bracelet formed of my improved construction.

Fig. 2 is a bottom plan view of a portion thereof.

Fig. 3 is a section on line 3—3 of Fig. 2.

Fig. 4 is a fragmental top view of the mold which is used for casting the bracelet.

Fig. 5 is a central section of the mold with the cover in place and with the flexible loop link chain positioned therein before the metal for the block links is poured into the different compartments.

Fig. 6 is a sectional view of the mold with the bracelet positioned therein and with the material filling the gate of the mold.

Fig. 7 is a section on line 7—7 of Fig. 4.

In the manufacture of bracelets it is desirable to connect a series of block links together in a simple and efficient manner to allow great flexibility between them and at the same time to securely connect the blocks together and in order to accomplish this result I have cast a plurality of block links about a pair of spaced loop link chains so that each of the chains is imbedded in the block links with the portions thereof between the block links forming a joint for flexibly connecting the block links together; and the following is a detailed description of the present method of forming such a bracelet:—

With reference to the drawings, 10 designates a mold which is provided with a plurality of compartments 11 formed by separating partitions 12 each of which is provided with spaced notches 13 and 14 to receive the loop link chains 15 and 16 which are laid therein to extend from one end of the bracelet to the other in parallel relation, as clearly illustrated in Fig. 6. Each of these compartments is inclined on the side as at 17 and the partitions are beveled as at 18 and 19 for properly shaping the block links.

A trough or gate 20 in the mold is provided with channels 21 leading to each of the compartments thru which the metal 22 to form the block links in a molten state flows to fill the compartments 11 and provide a plurality of block links 23 each imbedding a portion of the connecting loop link chains 15 therein.

These block links take on the form of the shape of the compartments having end bevels 24 and 25 to allow greater flexibility of the chains in one direction. The loop link chain is of such a size and is so positioned in the mold as to provide a connection between two links 26 and 27 in the space between adjacent block links so as to positively provide a point of flexing between the two.

In order to enhance the appearance of the bracelet, a design, as illustrated at 28, is formed on the top of the block links with recesses therein for the reception of gems 29, and the recesses are formed by depending projections 30 in the top wall of the mold located as desired.

It is, of course, obvious that it is not necessary for the connection between the block links to extend from one end of the bracelet to the other thru each of the links as the joints between the block links may be formed by placing one of any two connected and relatively movable parts in position to be imbedded in one block link and the other of the parts positioned to be imbedded in the other block link at the time of casting. It will also be understood that the gate 31 of the excess molten material will be severed from each of the block links at the points 32 after the links are taken from the mold.

Any suitable material may be used for the mold and any usual manner of casting may be employed. I have found that bronze is suitable as a mold in casting the so-called "white metal alloy" and that the surface of the mold may be smoked or covered with lamp black or any suitable substance for preventing adhesion of the mold and the material cast.

Further it will be apparent that by casting a block link about the connecting loop link chains that the block links are not movable relative to their connecting elements and thus a predetermined amount of flexibility may be always attained by a bracelet so formed which is of great advantage in practice.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A bracelet, chain or the like comprising a plurality of blocks, connecting elements for each end of the blocks having relatively movable parts between said blocks with one part cast in one block and another part movable relative to the first part and cast in an adjacent block.

2. A bracelet, chain or the like comprising a plurality of metal blocks, a series of connected loop links with portions cast in adjacent blocks and portions between adjacent blocks movable relative to each other to flexibly connect said blocks together.

3. A bracelet, chain or the like comprising a plurality of metal blocks, a pair of spaced chains each comprising a series of connected loop links with portions immovably imbedded in adjacent blocks and portions between adjacent blocks movable relative to each other to flexibly connect said blocks together.

In testimony whereof I affix my signature.

GEORGE H. DANSEREAU.